Figure 1:
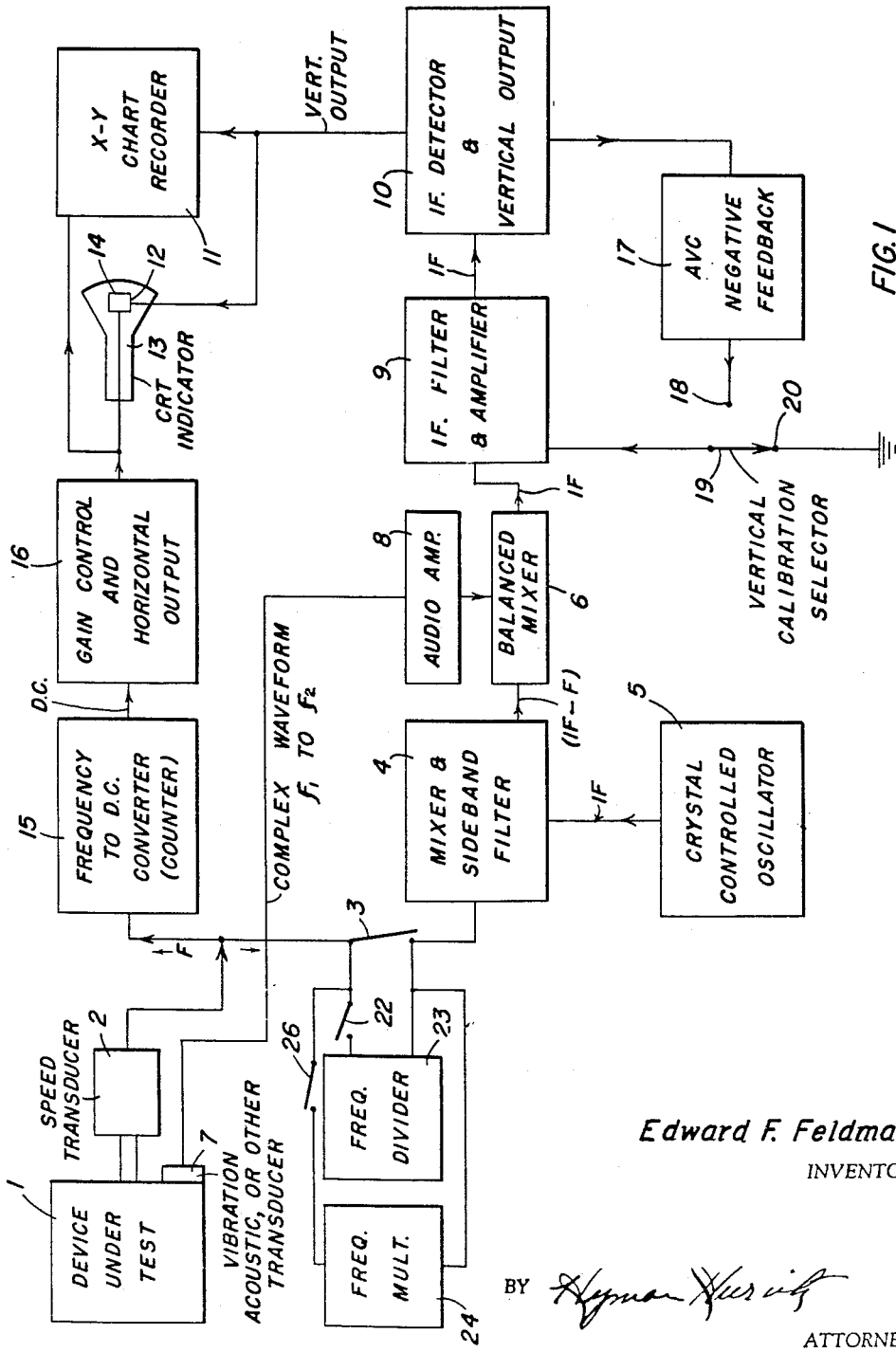

Feb. 7, 1961  E. F. FELDMAN  2,970,469
PANORAMIC HETERODYNE SYNCHRONOUS COMPONENT ANALYZER
Filed March 8, 1957  2 Sheets-Sheet 1

Edward F. Feldman
INVENTOR

BY Hyman Hurwitz
ATTORNEY

United States Patent Office 2,970,469
Patented Feb. 7, 1961

2,970,469

PANORAMIC HETERODYNE SYNCHRONOUS COMPONENT ANALYZER

Edward F. Feldman, New Rochelle, N.Y., assignor to Panoramic Radio Products, Inc., Mount Vernon, N.Y., a corporation of New York Filed Mar. 8, 1957, Ser. No. 644,830

3 Claims. (Cl. 73—67.2)

The present invention relates generally to systems for measuring vibrations, and more particularly to systems for measuring that signal frequency of acoustic or vibratory energy associated with a speed varying system, and the amplitude of signal, which corresponds with the speed, or with a predetermined function of the speed, over a wide range of speeds. More generally, the present invention concerns itself with devices for abstracting from a complex spectrum of signal frequencies any one signal frequency, in accordance with the value of a reference frequency, or of a harmonic or sub-harmonic of the reference frequency, or of a frequency displaced by a constant frequency interval from the reference frequency.

It is well known in the art to correlate the rotary speed of rotating machinery, while varying the speed over a wide range of values, with the amplitude of the acoustic or vibratory waves generated by the machinery which bear a predetermined frequency relation to the rotary speed. Such systems have, in the past, involved problems of frequency tracking, since they involved the selection of single frequencies or small frequency increments from the band of acoustic or vibrational frequencies generated by the machinery, and the correlation of these frequencies with a measurement of speed of the machinery. For example, speed of rotating machinery has, in the prior art, been measured and translated to a voltage amplitude, the voltage amplitude has been translated to local oscillator frequency of a frequency scanning superheterodyne receiver, so that each speed corresponded with a different local oscillator frequency, and the superheterodyne receiver has had applied to its input a gamut of frequencies corresponding with the acoustic or vibrational energy generated by the machinery. It is difficult, in such systems, to maintain correspondence, or tracking, between the tuning of the superheterodyne receiver and the acoustic or vibrational frequency it is desired to isolate.

It is an object of the present invention to provide a system for measuring the amplitude of, or establishing the existence of, that one frequency of a band of frequencies which corresponds with instantaneous speed of a speed varying device, without involving tracking problems.

It is another object of the present invention to provide a system for measuring the amplitude of acoustic or vibrational energy bearing a frequency correspondence with each speed of a speed varying device, by means of an arrangement which inherently tracks and relates speed with the acoustic or vibrational frequency.

It is another object of the present invention to provide an economical system for facilitating the measurement and plotting of amplitude of a single frequency of a complex band as a function of that frequency.

It is, on a broader basis, an object of the present invention to provide a system of panoramic spectrum analysis employing a superheterodyne principle, in which the I.F. frequency corresponds with the frequency of a fixed frequency local oscillator.

It is still another object of the present invention to provide a system in which a fixed frequency is converted in one sense algebraically with a reference frequency, and in which the product of conversion is reconverted in opposite algebraic sense with a band of frequencies, whereby the fixed frequency emerges in the products of reconversion only if the band of frequencies contains the reference frequency.

It is a further object of the present invention to provide a system for plotting amplitudes of harmonics or sub-harmonics of a frequency representative of speed of a device, against that speed.

It is still a further object of the present invention to provide a system for plotting amplitudes of signal frequencies at a fixed frequency difference from a frequency representative of speed of a machine, against speed of the machine.

It is still another object of the present invention to provide a panoramic system in which a frequency derived from a variable frequency source is combined with a fixed frequency, to generate a conversion product, and the conversion product combined with a band of frequencies under examination, to regenerate the fixed frequency whenever the variable frequency corresponds with a frequency of the band of frequencies under examination.

Figure 2:
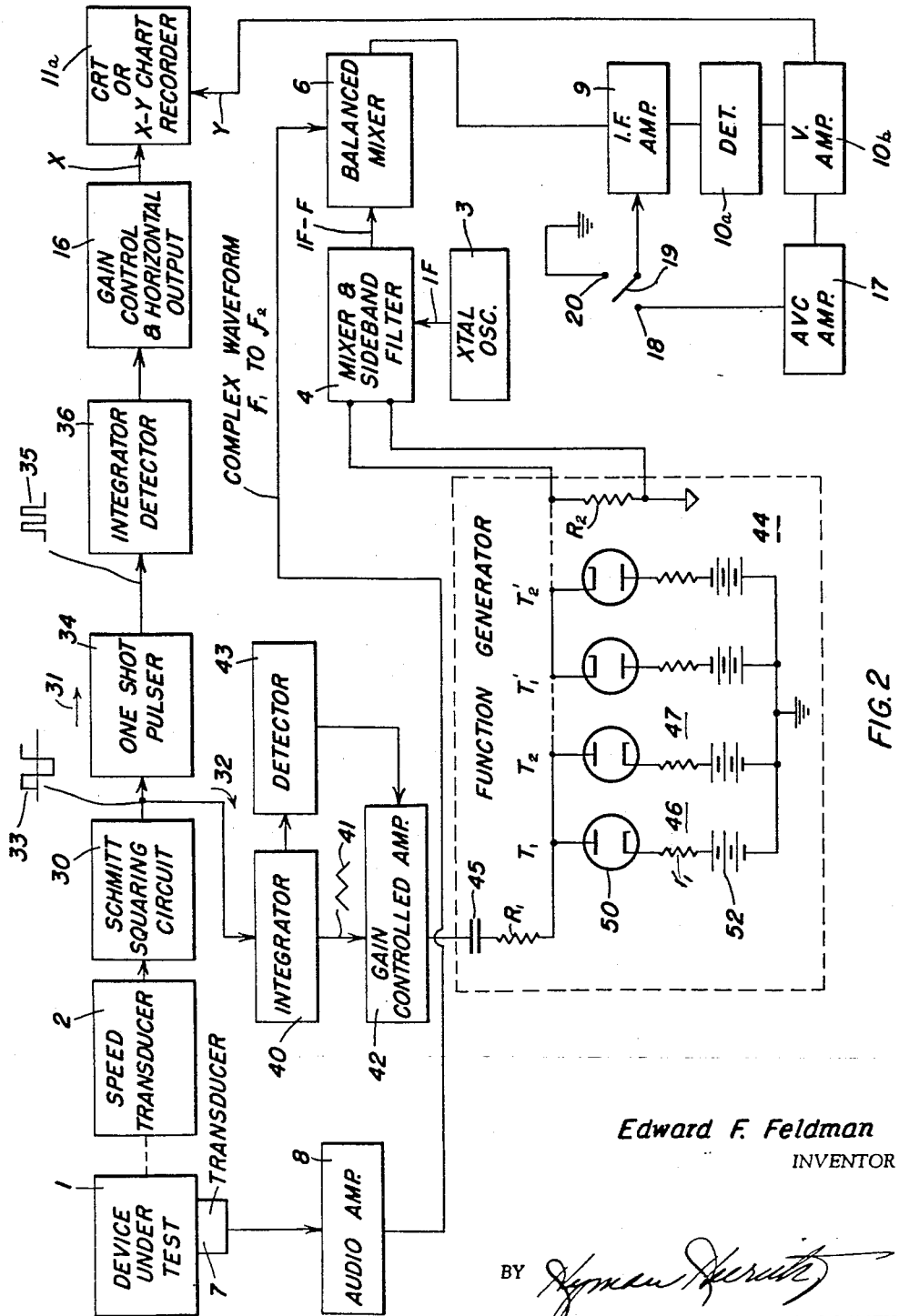

The above and still further objects, features and advantages of the present invention will become apparent upon consideration of the following detailed description of one specific embodiment thereof, especially when taken in conjunction with the accompanying drawings, wherein:

Figure 1 is a schematic circuit diagram of a system in accordance with the present invention; and Figure 2 is a schematic circuit diagram of a modification of the system of Figure 1.

Briefly describing a specific embodiment of the present invention, it is desired to derive a response corresponding with an amplitude of one frequency of a complex spectrum of frequencies, under control of a reference frequency. The latter may be variable over the entire complex spectrum of frequencies. The reference frequency may not be utilized directly as the local oscillator frequency of a superheterodyne receiver, to the input of which the spectrum of frequencies may be applied, because it falls within the spectrum. The theory of superheterodyne receivers requires that local oscillator frequency fall outside the receiver band, except for the limiting case in which the intermediate frequency is zero.

The reference frequency is, accordingly, heterodyned to a new frequency, by conversion with a fixed frequency local oscillator, and the latter frequency is employed as local oscillator frequency for application to a mixer, to which is applied the spectrum under examination. An I.F. amplifier may be connected to the output of the mixer, and if tuned to the fixed frequency, will have a response only when a frequency is present in the band under examination which equals the fixed frequency. Since the fixed frequency may derive from a crystal controlled oscillator, measurement of frequencies in the spectrum under examination may be very precise.

In accordance with a modification of the present system, the frequency of the I.F. filter and of the fixed frequency oscillator may be unequal. In such event the I.F. amplifier will have a response when a frequency component exists in the spectrum under examination, which is displaced from the fixed frequency by a value ΔF, where ΔF equals the difference between the I.F. frequency and the fixed frequency.

In the alternative, the reference frequency may be frequency multiplied or divided, by some integral number, N, such as 2, ½, 3, ⅓ or the like, before conversion thereof. In the latter event, the I.F. frequency will exist only when a frequency component exists within the spectrum under examination, which is related to the reference frequency by the multiplication factor N.

Still further the expedients suggested in the two last preceding paragraphs may be jointly employed.

In an alternative system, provision is made for compensating for departures from true sinusoidal shape of the reference frequency, which if permitted to exist would lead to inaccuracies in the plot generated by the system. In the alternative system the reference frequency may be approximately, but not accurately, sinusoidal. It may consist, for example, of the output of a speed measuring device, such as a tachometer. It is translated to a train of square waves, for example, and the square waves separated in two channels.

In one of the channels each square pulse is caused to generate a single relative sharp pulse of accurately predetermined height and width. The latter pulses are integrated to provide a voltage accurately representative of the frequency of the original approximately sinusoidal wave.

In the other of the channels the square waves are processed by an integrating process to form triangular waves of precisely determined peak amplitudes. The latter are passed through a function generator, which transforms them into accurately shaped sinusoidal waves for application to the converter of the system.

The present invention finds particular application to the analysis of the acoustic or vibrational spectrum of rotary machine, wherein it is desired to generate a plot of speed of the machinery against amplitude of a component of frequency of acoustic or vibrational energy generated by the machinery which bears a predetermined functional relationship to the speed. So if F is the speed of the machinery in revolutions per second, and if $f$ is a frequency of the acoustic or vibrational frequency spectrum generated by the machinery, it may be desired to plot $F$ vs. $f$ where $f=F$, or where $f=F\pm\Delta F$, or where $f=NF$, N being an integral number, or fraction, such as 2, 3, ½, ⅓, etc.

Referring now more specifically to the accompanying drawing, the reference numeral 1 denotes a device under test, which may comprise rotating machinery, and which may generate frequencies within a band, $f1$ to $f2$, which may be acoustic or vibrational. Means are provided for varying the speed of the device 1 over a desired array of frequencies within which the band $f1$ to $f2$ may be generated. Interest is centered on that frequency $f$ of the band which corresponds with the rotational frequency F of the device, or which bears a desired functional relation to the rotational frequency of the device, such as $f=F\pm\Delta F$, or $f=NF$, where N is a division or multiplication factor, or where $f=NF\pm\Delta f$.

Coupled to the device 1 is a speed transducer 2, which generates a frequency corresponding with the speed of the device 1, or with its rotary frequency. The output of transducer 1 is, accordingly, the frequency F.

The frequency F is applied, assuming switch 3 to be closed, to the input of a mixer and lower side-band filter 4, to which is also applied the output of a local oscillator 5. The latter may be crystal controlled, if desired, and in any event does not scan. Assuming the output frequency of the oscillator 5 to be IF, the output of mixer and side-band filter 4 is $IF-F$. This output is applied to a balanced mixer 6, to which is also applied a complex wave form falling within the band of frequencies, $f1$ to $f2$. The latter is derived from the device 1 by means of an acoustic transducer, a vibration transducer, or the like, 7. The complex wave form is amplified in an audio amplifier 8, and applied to the input of balanced mixer 6. The output of the balanced mixer 6 is applied to an I.F. filter and amplifier 9, tuned to frequency IF. Accordingly, if a signal of frequency corresponding with or equal to F and of given amplitude is present in the band $f1$ to $f2$, a signal will appear in the I.F. filter 9 of corresponding amplitude, but otherwise none will appear.

The output of IF amplifier 9 is detected and video amplified in a detector and video or vertical output amplifier 10. The output signal is then applied to the Y or vertical input terminal of an X—Y chart recorder, 11, capable of recording the X—Y, or horizontal and vertical coordinates, of a two dimensional plot. The output signal is also applied to the vertical deflection electrodes 12 of a cathode ray tube indicator 13, having horizontal deflection electrodes 14.

The output of transducer 2, i.e., F, is applied to a frequency to D.C. converter 15, which may be of the counter type for accuracy. The latter than generates a D.C. output signal having an amplitude representative of F. The latter is passed through a gain control circuit 16, and the latter supplies horizontal output signal to horizontal deflection electrodes 14, and to the X input terminal of X—Y chart recorder 11. The gain control circuit 16 may have a logarithmic response, to spread the lower audio octaves over the abscissa scale.

The output of the I.F. detector and vertical output amplifier 10 is applied to an AVC negative feed-back circuit 17, which supplies AVC signal to a switch terminal 18. A selector switch arm 19, connected to appropriate elements of I.F. filter and amplifier 9, may be connected to switch terminal 18, to derive logarithmic response of I.F. filter and amplifier 19, or to a grounded contact 20, if linear response is desired.

The oscillator 5 may be made variable in tuning, if desired. Thereby, a desired frequency separation ΔF between the frequency F as supplied by the speed transducer 2, and the component F1 supplied by the transducer 7 may be caused to occur.

The frequency F derived from the speed transducer 2 may, instead of being directly applied to the mixer and side-band filter 4, be applied via switch 22 to a frequency divider 23, the output of which proceeds to mixer and side-band filter 4. In the alternative, a frequency multiplier 25 may be employed, which may be selected by a switch 26. The net effect of this procedure is to generate displays of the amplitudes of the subharmonics or harmonics, respectively, of the frequency F, i.e., of NF. By displacing the frequency of oscillator 5 tracking of $NF\pm\Delta F$ may be accomplished.

There is generated on the face of the cathode ray tube indicator 3, and on the X—Y chart recorder 11, a plot of speed of the device under test, 1, as abscissa, and of amplitude of certain frequency components $f$ of the acoustic or vibrational output of the device 1 as ordinates. The latter frequency components may bear some desired relation with the speed of the device 1, i.e., with F, in revolutions per second. The simplest such relation is that of equality. The plotted frequencies may, in the alternative, represent $F\pm\Delta F$, or NF, or $NF\pm\Delta F$, where N is an integer, i.e., the plot may be of $f$ vs. $F$
$f$ vs. $NF$
$f$ vs. $F\pm\Delta F$
$f$ vs. $NF\pm\Delta F$ Response time of the system (for an inertialess indicator) is controlled by the selectivity of the I.F. filter 9, the time constant TC of which is $$\frac{1}{\pi(\text{bandwidth})}$$

and does not depend on inertia of mechanical devices preceding the indicator, as has been true of prior art systems.

Stability of the system is governed by the stability of oscillator 5, which may be crystal controlled if desired.

The I.F. bandwidth of I.F. filter and amplifier 9 may be fixed, or it may be variable, in accordance with principles taught in U.S. Patents Nos. 2,590,809 and 2,661,419, i.e., the I.F. bandwidth may be arranged to be small at lower values of frequency F, and larger at higher values, thus permitting better resolution in c.p.s. at the lower frequencies, and reducing the total time required to run through a series of speed values.

It will also be apparent that the signal applied to the mixer and side-band filter 4 may comprise both the frequency F and a harmonic or sub-harmonic of frequency F, all simultaneously, in which case a response will appear in I.F. amplifier 9 in response to any one or more of the specified frequencies.

In the system of Figure 2 the output of speed transducer 2, which it is assumed may depart from true sinusoidal shape, is caused to synchronize or control the generation of square waves, as in a Schmitt squaring circuit 30. The output of the Schmitt squaring circuit 30 is separated in two channels 31 and 32.

In the channel 31 the square waves 33, deriving from the squaring circuit 30, are caused to synchronize operation of a one shot pulser 34. The latter generates one pulse per cycle of square wave, and the pulse 35 so generated is of precisely predetermined energy content, i.e., height and width. The pulses 35 are integrated in an integrator detector 36, which provides a D.C. output proportional to the frequency of pulses 35. The output of integrator detector 36 is applied as the X or horizontal input of an oscilloscope or X—Y recorder 11a, via a gain control and horizontal output stage 16.

Accordingly, a horizontal or X deflection is generated which is directly proportional to the speed of rotation of the device under test, 1.

In the channel 32, the square wave output 33 of squaring circuit 30 is applied to an integrator 40. The output of an integrator is, in response to recurrent square wave input, a recurrent equilateral sawtooth wave 41. The latter will have amplitude inversely proportional to the frequency of the square wave, which is undesirable. According to the present invention, the peak amplitude of the sawtooth wave 41 is maintained constant by passing same through an automatically gain controlled amplifier 42, to which is applied gain control voltage derived by detecting the sawtooth wave 41 in a detector 43. The gain control system is so set up that the gain of amplifier 42 is increased with decrease of peak amplitude of its input, and vice versa.

The sawtooth output of gain controlled amplifier 42 is applied to a function generator or wave shaper 44, generally of known character, which serves to translate sawtooth input signal to sinusoidal output signal for a wide range of frequencies of input signal.

The function generator 44 includes a coupling capacitor 45, of sufficiently large value that no distortion is introduced at the lowest frequency of interest. In series with coupling capacitor 45 is a resistance R1, leading to a series of clipping circuits 46, 47 . . .

Each clipping circuit includes in series a diode, as 50, a resistance, as r, and a bias source, as 52. Half of the diodes 50 are poled to pass current in response to positive voltage, and the other half are poled to pass current in response to negative voltage. The biases are arranged such that when the sawtooth input voltage equals zero none of the diodes is conductive. At such time the output slope is proportional to R2, a terminating resistance for the function generator 44, divided by the sum of R1 and R2. When the sawtooth voltage attains a sufficiently positive value one of the diodes, say the first in order, conducts. The output slope is then reduced, and is proportional to the equivalent resistance of r1 and R2 divided by the sum of R1 plus this parallel combination.

As the sawtooth voltage increases by further increments, further ones of the diodes conduct, reducing the output slope further. A similar succession of events occurs in response to negatively poled increments of voltage. By providing a sufficient number of diodes, and by properly selecting values of bias voltage and series resistance, any desired output wave form may be simulated, in response to a known input wave form, and regardless of input frequency, within reasonable limits.

The output signal derivable across resistance R2 is applied as input signal to mixer and side band filter 4, the system of Figure 2 beyond the latter element duplicating the system of Figure 1, wherefore further detailed description of the system of Figure 2 is dispensed with as unnecessary to a complete exposition of the invention.

While I have described and illustrated several specific embodiment of my invention, it will be clear that variations of the general arrangement and of the details of construction which are specifically illustrated and described may be resorted to without departing from the true spirit and scope of the invention as defined in the appended claims.

What I claim is:

1. A panoramic system for analyzing a complex wide band spectrum of mechanical frequencies deriving from motion of a device under test, comprising a transducer for translating said spectrum of mechanical frequencies to a corresponding spectrum of electrical wave frequencies, speed transducer means for converting a component of periodic motion of said device into a generally sinusoidal electrical wave signal of inconstant amplitude and impure wave shape having a period fixedly related to the period of said periodic motion and corresponding with a frequency NF, where N is a constant, means for squaring said electrical wave signal to derive repetitive square waves, means for deriving from said repetitive square waves repetitive pulses occurring one for each cycle of said square waves, said repetitive pulses arranged to have all equal energy for all values of F, means for integrating said repetitive pulses comprising an integrating device, a visual indicator having means for generating an indication movable in two coordinate directions, means for moving said indication in one of said coordinate directions as a function of integrated product of said integrating device, means for shaping said repetitive square waves into pure sinusoidal waves of constant amplitude and of frequency NF for all values of NF, a source of constant frequency IF, means for heterodyning said frequencies NF and IF to derive a difference frequency $IF-NF$, a balanced mixer, means for applying to said balanced mixer for heterodyning therein said difference frequency $IF-NF$ and a frequency spectrum derived from said transducer, means for deriving from said balanced mixer an intermediate frequency signal spectrum, filter means for selecting a narrow band of frequencies from said intermediate frequency signal spectrum, and means responsive to the amplitude of response of said filter means for actuating said indication in the other of said coordinate directions.

2. A panoramic system for analyzing a complex spectrum of frequencies, comprising a source of a first signal of only approximately sinusoidal wave-shape of frequency, F, which is subject to variation over a predetermined relatively wide range of frequencies, means for deriving from said first signal a pulse for each cycle of said first signal, said pulses all having the same energy content, means for integrating said pulses to derive a D.C. voltage proportional to said frequency F, a first mixer, a source of oscillations of fixed frequency IF, means for deriving from said first signal a pure sinusoid of said frequency F, means for applying said pure sinusoid of frequency F and said oscillations of frequency IF to said first mixer for mixing thereby, means for selecting one of the conversion products $IF \pm F$ derivable from said first mixer, a second mixer, means for applying to said second mixer said spectrum of frequencies and said one of said conversion products, and a filter for deriving from said second mixer a signal at the frequency IF, whenever a predetermined function of the frequency F appears in said complex spectrum frequencies, means for generating an indication movable in two coordinate directions, according to the amplitude of said D.C. voltage and the amplitude of the last mentioned signal respectively, wherein is provided a wave shaping circuit intermediate said source of first signal of frequency F and said mixer, said wave shaping circuit arranged to provide an accurately sinusoidal wave shape of frequency F in response to an approximately sinusoidal wave shape of frequency F.

3. A panoramic system for analyzing a complex spectrum of frequencies, comprising a source of a first signal of only approximately sinusoidal wave-shape of frequency, F, which is subject to variation over a predetermined relatively wide range of frequencies, means for deriving from said first signal a pulse for each cycle of said first signal, said pulses all having the same energy content, means for integrating said pulses to derive a D.C. voltage proportional to said frequency F, a first mixer, a source of oscillations of fixed frequency IF, means for deriving from said first signal a pure sinusoid of said frequency F, means for applying said pure sinusoid of frequency F and said oscillations of frequency IF to said first mixer for mixing thereby, means for selecting one of the conversion products $IF \pm F$ derivable from said first mixer, a second mixer, means for applying to said second mixer said spectrum of frequencies and said one of said conversion products, and a filter for deriving from said second mixer a signal at the frequency IF, whenever a predetermined function of the frequency F appears in said complex spectrum frequencies, means for generating an indication movable in two coordinate directions, according to the amplitude of said D.C. voltage and the amplitude of the last mentioned signal respectively, wherein is provided a wave shaping circuit intermediate said source of first signal of frequency F and said mixer, said wave shaping circuit arranged to provide an accurately sinusoidal wave shape of frequency F in response to an approximately sinusoidal wave shape of frequency F, wherein said wave shaping circuit includes means responsive to said approximately sinusoidal wave shape of frequency F to generate a square wave shape of frequency F, means for processing said square wave shape of frequency F to provide a sawtooth wave shape of frequency F, means for maintaining constancy of amplitude of said sawtooth wave shape with variation of value of said frequency F, and means for adjusting the shape of the sawtooth wave shape at intermediate points thereof in such manner as to provide said accurately sinusoidal wave shape.

References Cited in the file of this patent

UNITED STATES PATENTS

| 2,260,933 | Cooper | Oct. 28, 1941 |
| 2,361,990 | Brown | Nov. 7, 1944 |
| 2,610,505 | Hope | Sept. 16, 1952 |

FOREIGN PATENTS

| 594,674 | Great Britain | Nov. 17, 1947 |